United States Patent [19]

Myer et al.

[11] Patent Number: 5,625,871
[45] Date of Patent: Apr. 29, 1997

[54] CELLULAR COMMUNICATIONS SYSTEM WITH MULTICARRIER SIGNAL PROCESSING

[75] Inventors: Robert E. Myer, Denville; Jack C.-C. Wen, Parsippany, both of N.J.

[73] Assignee: Lucent Technologies Inc., Murray Hill, N.J.

[21] Appl. No.: 315,383

[22] Filed: Sep. 30, 1994

[51] Int. Cl.$^6$ .................................................. H04Q 7/30
[52] U.S. Cl. ...................... 455/33.1; 455/53.1; 455/59; 370/343; 375/349
[58] Field of Search .............................. 455/33.1, 17, 63, 455/67.3, 275, 276.1, 278.1, 296, 303, 304, 305, 59, 53.1; 370/19, 121, 69.1, 123; 375/348, 349

[56] References Cited

U.S. PATENT DOCUMENTS

| | | | |
|---|---|---|---|
| 4,509,206 | 4/1985 | Carpe et al. | 455/245 |
| 4,583,049 | 4/1986 | Powell | 330/151 |
| 4,881,222 | 11/1989 | Goeckler et al. | 370/70 |
| 4,912,722 | 3/1990 | Carlin | 375/1 |
| 4,926,440 | 5/1990 | Mikoshiba et al. | 375/1 |
| 5,038,341 | 8/1991 | Berman et al. | 370/18 |
| 5,222,106 | 6/1993 | Satoh et al. | 375/102 |
| 5,302,914 | 4/1994 | Arntz et al. | 330/129 |
| 5,304,945 | 4/1994 | Myer | 330/149 |
| 5,315,583 | 5/1994 | Murphy et al. | 370/18 |
| 5,345,439 | 9/1994 | Marston | 370/18 |
| 5,369,664 | 11/1994 | Takahashi et al. | 375/1 |
| 5,369,782 | 11/1994 | Kawano et al. | 455/16 |

OTHER PUBLICATIONS

"Microwave Frequency Selective Limiting Filters", *GEC-Marconi*, P.K. Kimber, A.N. Farr, N.A. Howard Nov. 1992.

Primary Examiner—Reinhard J. Eisenzopf
Assistant Examiner—Lee Nguyen

[57] ABSTRACT

The present invention provides an improved cellular communications system which reduces the dynamic range of a received multicarrier signal. The cellular communications system includes at least one cell site. A base station cooperating with an antenna is positioned within the cell site and is configured to communicate with at least one wireless terminal. A receiver is positioned within the base station for receiving multicarrier signals. Within the receiver is positioned a dynamic range-reducing multicarrier signal processor which reduces the dynamic range of a received multicarrier signal.

4 Claims, 5 Drawing Sheets

CELLULAR COMMUNICATIONS SYSTEM WITH MULTICARRIER SIGNAL PROCESSING

FIELD OF THE INVENTION

The present invention relates to cellular communications systems employing multicarrier signal processing and, more particularly, to cellular communications systems employing methods and apparatus which alter the dynamic range of a multicarrier signal.

BACKGROUND OF THE INVENTION

In radio transmission and reception systems, a radio receiver is typically confronted with a multicarrier signal, i.e., a signal comprising a plurality of carrier signals having different signal characteristics, such as different frequencies. Due to variations in broadcast strength and the different locations from which they are broadcast, the respective carrier signals of a multicarrier signal arrive at a particular radio receiver with varying strengths. The difference in strength between the highest and lowest constituent carrier signals defines the dynamic range of the multicarrier signal.

Figure 1:
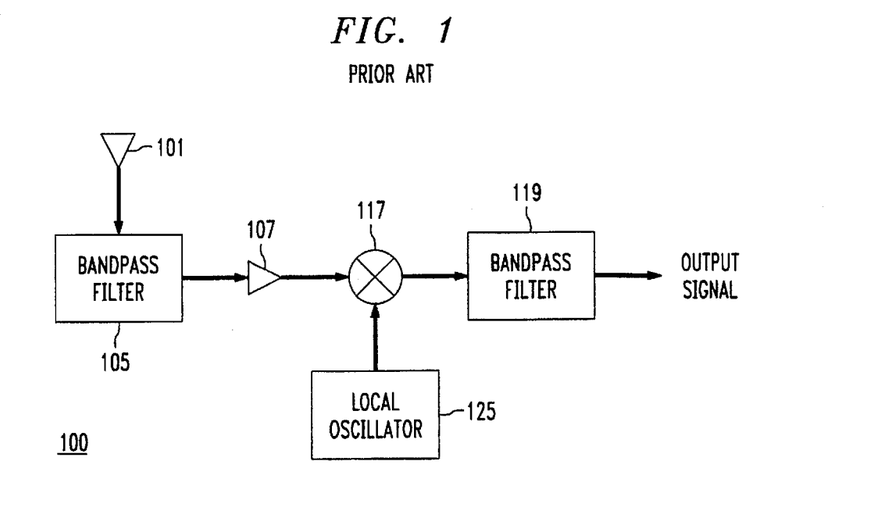
FIG. 1 depicts a schematic diagram of a conventional radio receiver front-end.

FIG. 1 depicts a schematic diagram of the front-end of a conventional radio receiver. Receiver 100 receives the broadband signal via antenna 101. Bandpass filter 105 takes the received broadband signal and passes only the multicarrier signal, eliminating signals whose frequencies are outside the multicarrier range defined by the filter. The multicarrier signal is mixed down by mixer 117 cooperating with local oscillator 125 and sent to a second bandpass filter 119. Bandpass filter 119 selects the particular frequency band or bands of interest which form the output signal. Typically, the utility of a radio receiver is limited by the dynamic range of the receiver components that process the signals of interest. More specifically, the dynamic range which the radio receiver can satisfactorily process is usually limited, at one extreme, by noise, and at the other extreme, by the inherent physical characteristics of mixer 117. If the dynamic range of mixer 117 is too low, the mixing of a multicarrier signal with a wide dynamic range can introduce undesirable intermodulation products into the output signal. When the radio receiver forms a portion of a cellular communications system, the wide variation in signal power levels creates particular signal processing problems. Therefore, there is a need in the art for signal processing elements which can process multicarrier signals with wide dynamic ranges without introducing distortion in the resultant output signal. Such signal processors could advantageously be employed in radio receivers and cellular communications systems to reduce the dynamic range of multicarrier signals.

SUMMARY OF THE INVENTION

The present invention provides an improved cellular communications system which reduces the dynamic range of a received multicarrier signal. The cellular communications system includes at least one cell site. A base station cooperating with an antenna is positioned within the cell site and is configured to communicate with at least one wireless terminal. A receiver is positioned within the base station for receiving multicarrier signals. Within the receiver is positioned a dynamic range-reducing multicarrier signal processor which reduces the dynamic range of a received multicarrier signal.

DETAILED DESCRIPTION

Figure 2:
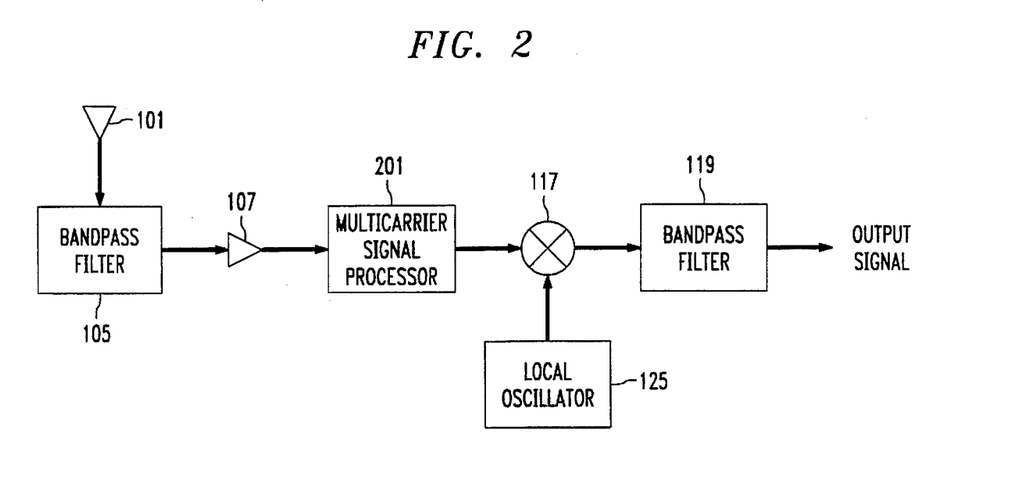
FIG. 2 depicts an illustrative radio receiver according to the present invention.

Turning now to the drawings in detail in which like numerals indicate the same or similar elements, FIG. 2 depicts a schematic diagram of a multicarrier signal processor 201 for reducing the dynamic range of a multicarrier signal within a cellular communications system according to the present invention. Illustratively, signal processor 201 is described as part of radio receiver front-end 100. However, it will be appreciated by those skilled in the art that signal processor 201 is used to process multicarrier signals in a wide variety of systems and devices including, but not limited to radio systems, audio systems, radar systems, and the like. Radio receiver front-end 100 processes a multicarrier signal comprising a plurality, P, of carrier signals, each of which is individually situated in one of a plurality, P, of distinct frequency bands. Any group of frequency bands can be employed, including those frequency bands having varying widths and non-contiguous frequency bands. The grouping of frequency bands defines a frequency range R.

Figure 7:
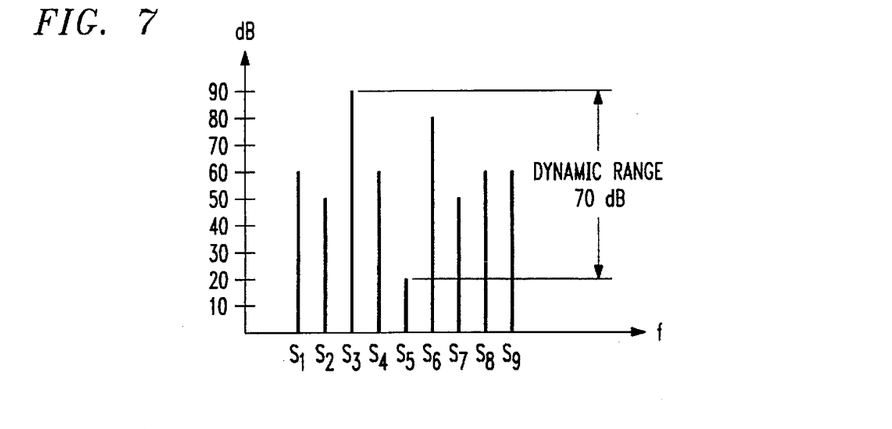
FIG. 7 depicts the spectral content of an exemplary multicarrier signal.
Figure 8:
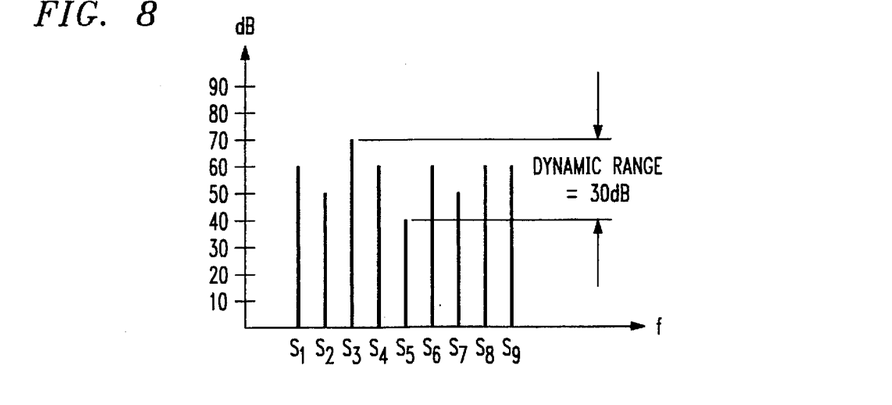
FIG. 8 depicts the spectral content of the multicarrier signal of FIG. 7 after it has been altered according to the present invention.

FIG. 7 schematically depicts the spectral content of a typical multicarrier signal comprising nine constituent carrier signals, labeled S1 to S9, each of which is situated in a distinct frequency band. The dynamic range of the multicarrier signal is 70 dB (the difference in magnitude between the strongest constituent carrier signal, $S_3$, and the weakest constituent carrier signal, $S_5$). According to the present invention, the dynamic range of the multicarrier signal in FIG. 7 is reducible by 40 dB, as shown in FIG. 8, by attenuating the power of signals $S_3$ and $S_6$ by 20 dB and boosting the power of signal $S_5$ by 20 dB. As a result, the dynamic range of the processed signal of FIG. 8 is 30 dB.

Multicarrier signal processor 201 is typically employed in radio receiver front-end 100 to reduce the dynamic range of a group of P carrier signals of a multicarrier signal. The radio receiver front-end generally comprises antenna 101, bandpass filter 105, multicarrier signal processor 201, amplifier 107, mixer 117, and local oscillator 125. The radio receiver front-end components are selected from any components or group of components which perform the stated functions, and will not be described in detail. Further description of radio components such as those used in receiver front-end 100 is found in Hickman, *Newnes Practical RF Handbook*, (Newnes, Oxford), c. 1993, the disclosure of which is incorporated by reference herein.

Figure 9:
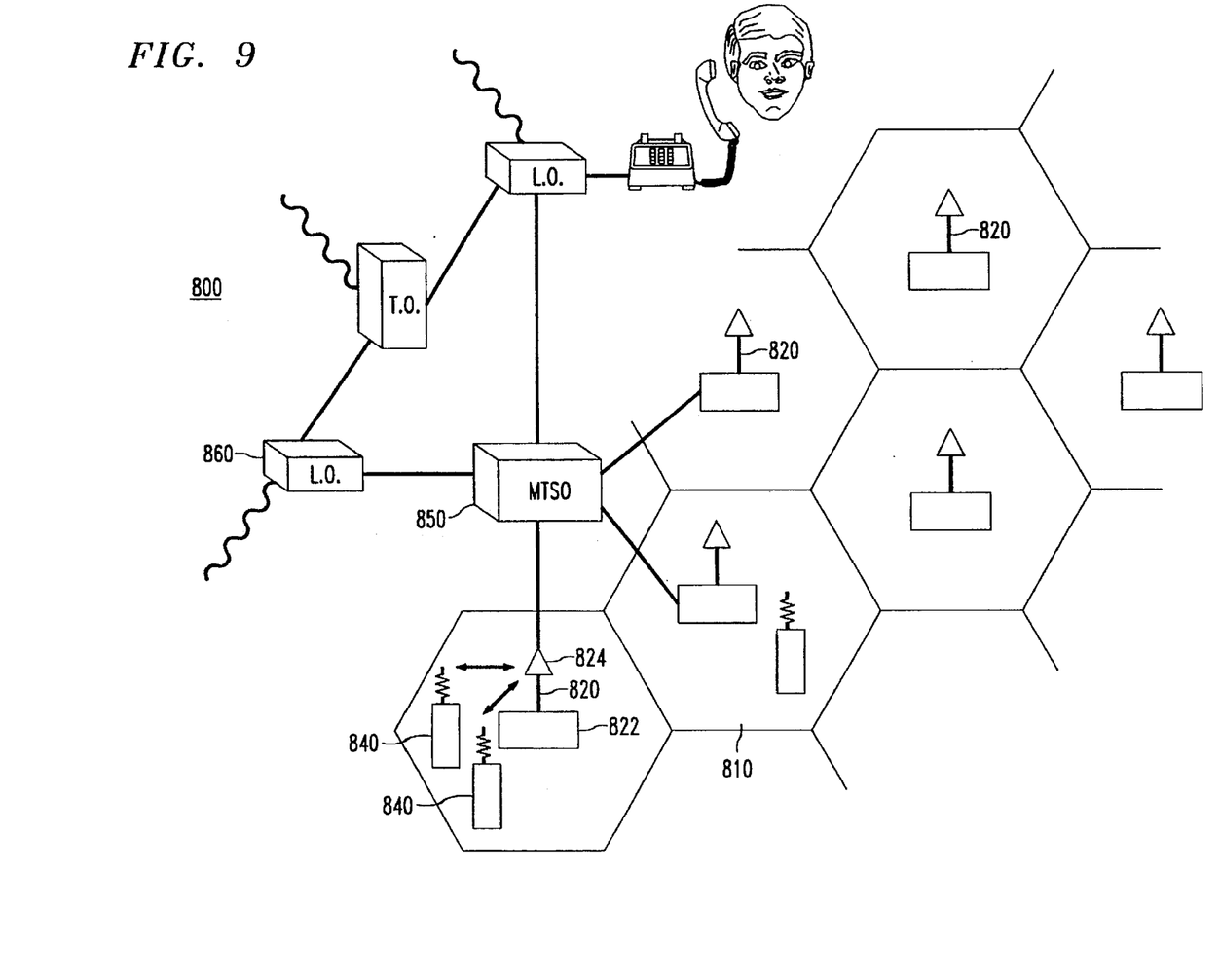
FIG. 9 is a schematic illustration of a cellular communications system which incorporates the multicarrier signal processor of the present invention.

Cellular communications systems employ radio receivers incorporating radio receiver front end 100 at several positions within a system. FIG. 9 depicts cellular communications system 800, partitioned into a number of geographically distinct areas called cells. Cell 810 is schematically depicted as a hexagon, however, in practice a cell typically has an irregular shape depending upon the topography of the terrain serviced by the cellular system. Within the cell 810 is provided a cell site 820 which generally includes a base station 822 cooperating with an antenna 824. Radio receiver front end 100 is typically incorporated within the base station of cell site 820. The multicarrier signal processor of the present invention cooperates with the base station receiver to reduce the dynamic range of a multicarrier signal. Wireless terminals 840 communicate with cell site 820 via radio links. As used herein, the expression "wireless terminals" refers to any communications device which receives or transmits an electromagnetic signal, including, but not limited to, mobile telephones, pagers, and personal communicators.

Cell site 820 optionally communicates with a mobile telecommunications switching office (MTSO) 850, also known as a mobile switching center (MSC). The MTSO typically comprises a large switch (e.g., the 5ESS® switch available from AT&T Corp.) that routes call to and from wireless terminals in the cellular system and, if necessary, to and from the public switched telephone network (PTSN) via a local office switch 860. Local office switch 860 communicates with a toll office as shown. Detailed descriptions of cellular communications systems are found in Lee, *Mobile Cellular Telecommunications Systems*, (McGraw-Hill, N.Y.), c. 1989, Lee, *Mobile Communications Design Fundamentals*, (Wiley-Interscience), c. 1993, *Transmission Systems For Communications*, (Bell Telephone Laboratories, N.J.), c. 1982, Rey, Ed. *Engineering and Operations in the Bell System*, (AT&T Bell Laboratories, Murray Hill, N.J.), c. 1983, and Young, *Wireless Basics*, (Intertec, Chicago), c. 1992, the disclosures of which are incorporated herein by reference.

In the frequency range of interest, R, a multicarrier signal typically comprises a plurality of carrier signals with greatly disparate relative powers, i.e., a signal with a large dynamic range. Large dynamic range multicarrier signals negatively impact the performance of numerous system components with limited dynamic ranges such as mixers, amplifiers, and analog-to-digital converters. For example, when the physical dynamic range of mixer 117 is less than the dynamic range of the multicarrier signal, mixer 117 can introduce intermodulation products into the multicarrier signal. The intermodulation products combine with the carrier signals, creating a distorted output. Multicarrier signal processor 201 mitigates such problems in an exemplary embodiment by analyzing the multicarrier signal to determine the relative power of each of the constituent carrier signals. Based on the analysis, the multicarrier signal processor targets one or more of the constituent carrier signals whose power is beyond a particular range, the range being preset or determined from the multicarrier signal analysis. The multicarrier signal processor samples the multicarrier signal and sends at least one sampled multicarrier signal to a signal modifier which changes the phase and/or amplitude of the targeted constituent carrier signal. The targeted constituent signal is selected from an individual frequency band or a block or frequency bands, depending upon system needs. The modified signal is injected back into the unmodified multicarrier signal in a feedforward architecture. In this manner, the modified signal interacts with the corresponding unmodified constituent carrier signal to reduce the overall dynamic range of the multicarrier signal.

Figure 3:
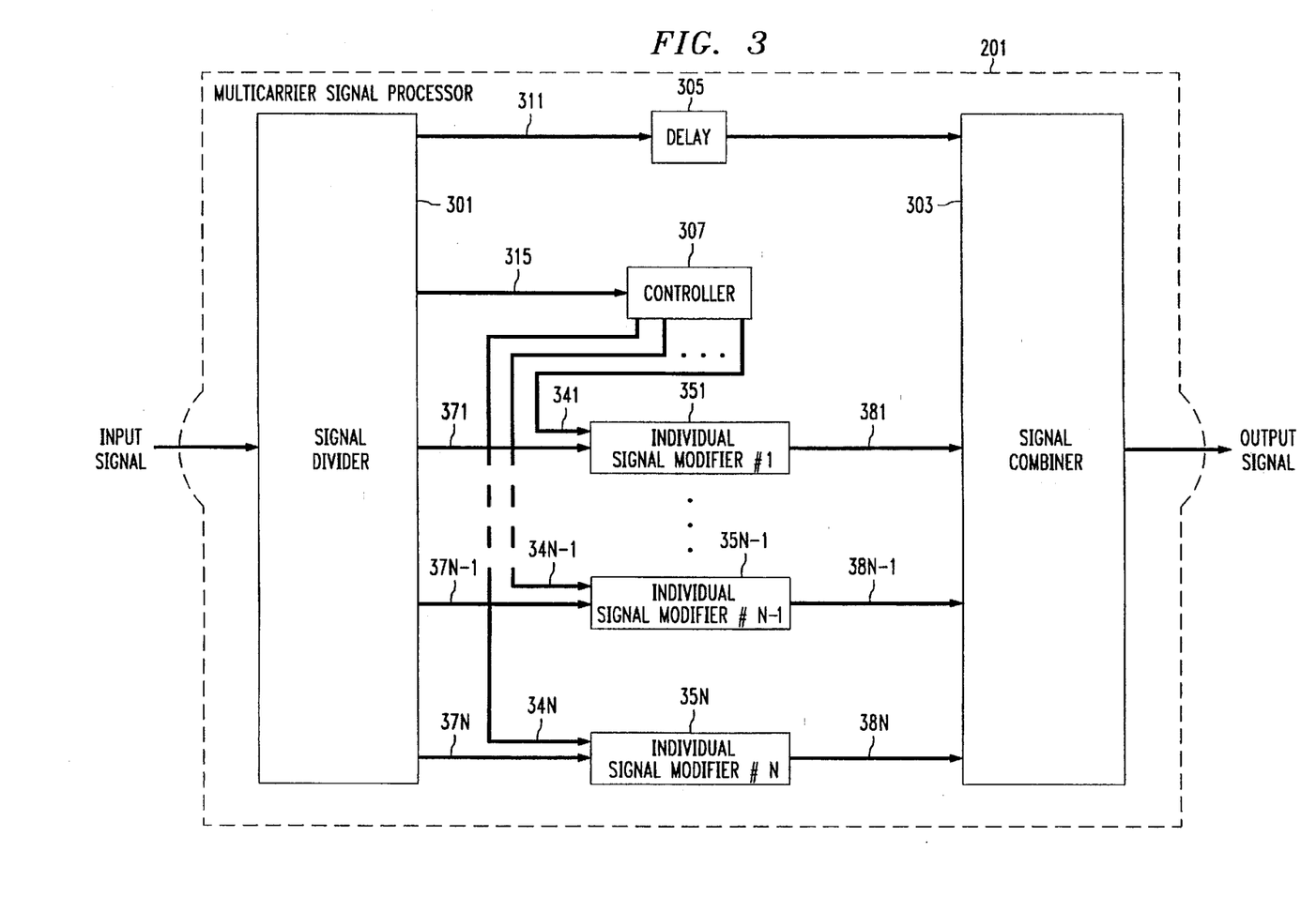
FIG. 3 depicts a block diagram of an illustrative embodiment of the present invention.

Multicarrier signal processor 201 reduces the dynamic range of a multicarrier signal in an exemplary embodiment depicted in FIG. 3. FIG. 3 depicts a block diagram of the processor 201, which comprises, signal divider 301, signal combiner 303, delay 305, controller 307, and one or more individual signal modifiers, represented by 35N. As used herein, N represents the number of individual signal modifiers in a given embodiment. While there can be any number, N, of individual signal modifiers for a particular application, N is typically less than P. Furthermore, while the number of individual signal modifiers used in an embodiment is selected based on system considerations, larger numbers of individual signal modifiers generally increase the ability of the multicarrier signal processor to reduce the dynamic range of a multicarrier signal. Alternatively, the individual signal modifiers of the present invention can be coupled in series such that a multicarrier signal is sequentially processed by the individual signal modifiers.

As depicted in FIG. 3, the incoming multicarrier signal is processed by signal divider 301. Signal divider 301 receives the multicarrier signal and takes N+2 samples of it, each of which is typically an analog representation of the multicarrier signal. Signal divider 301 places one sample of the multicarrier signal onto each of signal paths 311, 315, 371, . . . 37N-1 and 37N. Preferably, signal divider 301 is fabricated so that the majority of the power of the multicarrier signal is put onto signal path 311. Signal divider 301 is advantageously selected from compound splitters, which generally comprise a combination of 1:2 or 1:3 Wilkinson or hybrid couplers. However, any element which takes an incoming signal and provides plural outputs can be used as signal divider 301.

One of the sampled signals is placed on signal path 315 and fed to controller 307. Controller 307 receives this multicarrier signal sample and performs several functions. First, the controller analyzes the multicarrier signal to determine the relative power of each of the carrier signals. This may be done on all of the carrier signals simultaneously (e.g., with a fast fourier transform) or serially by scanning for individual carrier signals, one at a time, across the frequency range, R.

In an exemplary embodiment, controller 307 is programmed with a threshold. The threshold is typically a range selected such that any constituent carrier signal having a power below the threshold lower limit is amplified and any constituent carrier signal having a power above upper limit is attenuated. In this manner, individual carrier signals with power levels that are excessively high or excessively low relative to the other carrier signals are automatically attenuated or automatically amplified. This threshold programming may be performed in any known manner. In an exemplary embodiment, the multicarrier signal processor operates with CDMA (code division multiple access) cellular communications systems such that the CDMA equipment is not overwhelmed by signals from analog systems. In this embodiment, the multicarrier signal comprises both CDMA signals, i.e., spread-spectrum-modulated signals, and higher-powered analog signals, e.g., amplitude-modulated and frequency-modulated signals. Controller 307 is preset with a upper threshold which eliminates the substantially higher-powered analog signals. In this embodiment, the controller instructs the individual signal modifiers to modify the large carrier signal such that the modified signal, when combined with the unmodified multicarrier signal, substantially eliminates the large carrier signal. In a CDMA system, the controller is typically positioned in the CDMA receiver after the bandpass filter, such that the mixer and other dynamicrange-sensitive components are not influenced by the higher-powered analog signals.

After analyzing the incoming multicarrier signal, controller 307 directs individual signal modifiers 351, ... 35N-1, 35N via pathways 341 ... 34N-1, 34N to isolate and modify a particular constituent carrier signal from the multicarrier signal. Each individual signal modifier, 351 ... 35N-1, 35N, respectively receives an unmodified multicarrier signal sample from signal divider 301 through paths 371 ... 37N-1, 37N. The individual signal modifier isolates its targeted constituent carrier signal or block of carrier signals as directed by controller 307, and modifies it. In an exemplary embodiment, the phase and/or amplitude of the targeted signal is/are changed in preparation for injection back into the unmodified multicarrier signal. For a constituent carrier signal having a large amplitude, the amplitude can be decreased by the signal modifier. Alternatively, a constituent carrier signal can be created having the same amplitude but 180° out of phase with the corresponding unmodified constituent carrier signal. For either modification technique, the strength of the constituent carrier signal within the multicarrier signal is reduced upon combination with the corresponding unmodified constituent carrier signal. The modified constituent carrier signals are output through signal pathways 381, 38N-1, 38N to signal combinet 303 for combination with the unmodified multicarrier signal.

Signal combiner 303 receives N+1 signals: one from signal path 311 and one from each of the N individual signal modifiers through pathways 381 ... 38N-1, 38N, and injects the modified isolated signals back into the unmodified multicarrier signal. Typically, combiner 303 creates an output signal that is the vector sum of all N+1 signals. Signal combinet 303 is generally selected from any compound splitter, particularly, compound splitters which comprise a combination of 1:2 or 1:3 Wilkinson or hybrid couplers. However, any component which combines signals received from plural pathways can be employed as signal combiner 303.

The signal sample received from path 311 is a delayed, unmodified multicarrier signal. Delay 305 in signal path 311 is preferably set so that the delay through signal path 311 is equal to the delay through signal paths 37N, individual signal modifiers 35N and signal paths 38N. Delay elements impart a negative phase slope to the signal upon which they act. Delay 305 and the phase shift imparted by each individual signal modifier must be carefully coordinated so that signal combiner 303 effectively performs a vector addition of all of the signals which enter it. In other words, if individual signal modifier 35N is to attenuate a given carrier signal, delay 305 must be set so that the multicarrier signal through signal path 311 and the isolated and modified signal through individual signal modifier 35N arrive at signal combiner 303 at the same time. In the case of signal attenuation, the phase of the output signal from the individual signal modifier is shifted 180° relative to the phase of the unmodified carrier signal, so that the two signals destructively interfere.

Alternatively, delay 305 is eliminated from signal path 311 and a negative delay element is inserted in signal paths 381, 38N-1, 38N. Negative delay elements, such as negative group delays, create signals which appear to have propagated a shorter distance than the actual path length by imparting a positive phase slope to the signal. The use of negative delay elements in signal paths 381, 38N-1, 38N, reduces the loss of the unmodified multicarrier signal in signal path 311. Since, in an exemplary embodiment, the majority of the signal strength traverses signal path 311, the overall loss in the multicarrier signal processor is reduced through the use of negative group delays. Exemplary negative group delays are described in U.S. Pat. No. 5,291,156, the disclosure of which is incorporated by reference herein.

For the case of carrier signal amplification, the delay 305 is identical, since the time through the signal paths is the same. However, the phase of the modified carrier signal from the individual signal modifier is adjusted, relative to the phase of the respective unmodified carrier signal, so that the two signals are constructively added.

Figure 4:
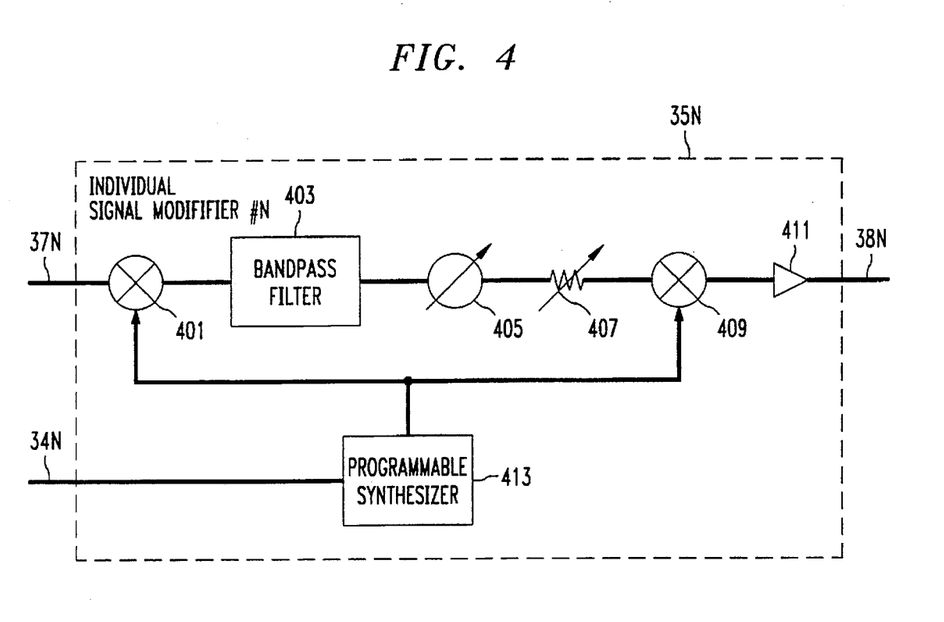
FIG. 4 is a block diagram of the individual signal modifier of FIG. 3.

Individual components of multicarrier signal processor 201 will now be described with reference to FIGS. 4-6. FIG. 4 schematically depicts an individual signal modifier 35N for use in the multicarrier signal processor. Each individual signal modifier, i.e., individual signal modifier 351, 35N-1, and 35N, isolates a targeted carrier signal and modifies its phase and/or amplitude in preparation for being injected back into the unmodified multicarrier signal. The individual signal modifier of FIG. 4 comprises mixer 401, bandpass filter 403, phase-shifter 405, amplitude modifier 407, mixer 409, amplifier 411 and programmable synthesizer 413.

A sample of the multicarrier signal enters mixer 401 from signal path 37N. Mixer 401 mixes down the multicarrier signal, so that bandpass filter 403 can isolate the constituent carrier signal targeted for modification by controller 307. Programmable synthesizer 413 directs mixer 401 to shift the incoming multicarrier signal such that the targeted carrier signal is positioned at the pass frequency of bandpass filter 403. In this manner, the carrier signal targeted by controller 307 is isolated from the multicarrier signal by bandpass filter 403. The carrier signal that is isolated by bandpass filter 403 will be referred to as an isolated carrier signal. Bandpass filter 403 is typically a high Q bandpass filter with a passband equal to the frequency bandwidth of the targeted signal or block of signals.

The isolated carrier signal exits the bandpass filter and is fed to phase shifter 405. Phase-shifter 405 selectively changes the phase of the isolated carrier signal by a given number of degrees. For example, by shifting the phase of the signal such that the signal is 180° out of phase with the unmodified carrier signal, the modified carrier signal destructively interferes with the unmodified carrier signal. When the modified signal is to constructively add with the unmodified carrier signal, the phase shifter is set such that the modified and unmodified carrier signals are in phase with one another. In this manner, the modified isolated carrier signal from the individual signal modifier, when injected back into the multicarrier signal by signal combiner 303, interacts with the corresponding unmodified carrier signal by destructively interfering or constructively adding with the unmodified carrier signal to reduce the overall dynamic range of the multicarrier signal. Phase-shifter 405 is provided with either a fixed phase shift, i.e., a phase shift preset for a given number of degrees, or it is provided with a variable capability that is controlled by controller 307. In an exemplary embodiment, phase shifter 407 is programmable such that it adjusts the phase of the signal according to its frequency.

Following phase shifter 405, the isolated carrier signal next enters amplitude modifier 407. While amplitude modifier 407 is illustratively depicted as an attenuator, the modifier is selected from elements which can amplify, attenuate, or alternatively amplify or attenuate an incoming signal, e.g., amplifiers which are capable of both attenuating and amplifying. The amount by which signal modifier 407 either amplifies or attenuates the isolated carrier signal is selected to be either fixed or variable, depending upon system considerations. When the amount is variable, controller 307 directs the amount of attenuation or amplification to be produced by amplitude modifier 407.

While each individual signal modifier can either attenuate or amplify the isolated carrier signal, in an exemplary embodiment signals are only attenuated. Attenuation of signals tends to result in an overall better noise figure for the multicarrier signal processor. In this embodiment, amplitude modifier 407 is selected to be an attenuator. Typically, the attenuator attenuates the isolated carrier signal by approximately 20 to 30 dB.

Following signal modification, the modified isolated carrier signal enters mixer 409. Mixer 409 mixes up the modified isolated carrier signal, as directed by programmable synthesizer 413, to the frequency band in which the carrier signal resided prior to mixing down by mixer 401. The modified isolated carrier signal is amplified by amplifier 411, then output to signal combiner 303 via path 38N.

Following vector combination in signal combiner 303, the modified multicarrier signal is optionally input to another multicarrier signal processor serially connected to the previous multicarrier signal processor. This arrangement provides further reduction in the dynamic range of a multicarrier signal.

Figure 5:
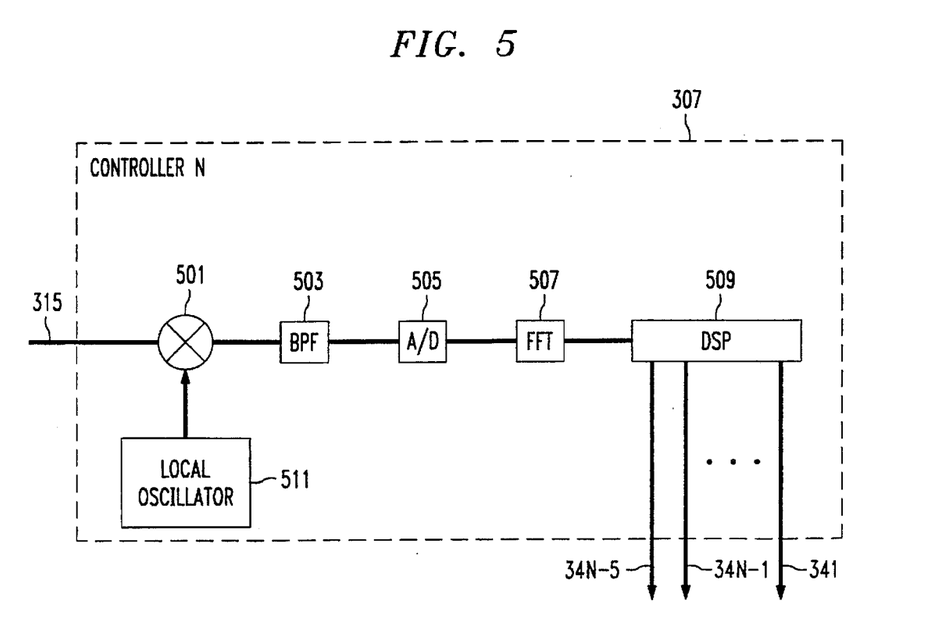
FIG. 5 is a block diagram of an illustrative controller as shown in FIG. 3.

FIG. 5 depicts a block diagram of an illustrative embodiment of controller 307, in which the multicarrier signal is analyzed with a fast fourier transform. In this embodiment, controller 307 comprises mixer 501, local oscillator 511, bandpass filter 503, analog-to-digital converter 505, fast-fourier transform analyzer 507 and digital signal processor 509. The multicarrier signal received from signal divider 301 via signal path 315 is mixed down by mixer 501 to an intermediate frequency, in well-known fashion. Mixer 501 is controlled by local oscillator 511. The mixed-down signal is input to bandpass filter 503. Bandpass filter 503 is preferably a high Q filter with a passband width equal to the frequency range, R, of interest.

The filtered multicarrier signal is passed to analog-to-digital converter 505. Analog-to-digital converter 505 converts the analog output of bandpass filter 503 to a digital format for analysis by fast-fourier transformer 507. Fast-fourier transformer 507 takes the multicarrier signal and produces its spectral content, as illustrated in FIGS. 7 and 8. Digital signal processor 509 takes the output of fast-fourier transformer 507, and analyzes the dynamic range, determining which carrier signals should be targeted for attenuation (or amplification) and, optionally, the amount of attenuation or amplification. In one embodiment, digital signal processor 509 also determines the amount of phase shift for each targeted carrier signal or block of carrier signals. Additionally, digital signal processor 509 sends a signal to each individual signal modifier indicating which targeted carrier signal the individual signal modifier is to isolate for attenuation or amplification.

Figure 6:
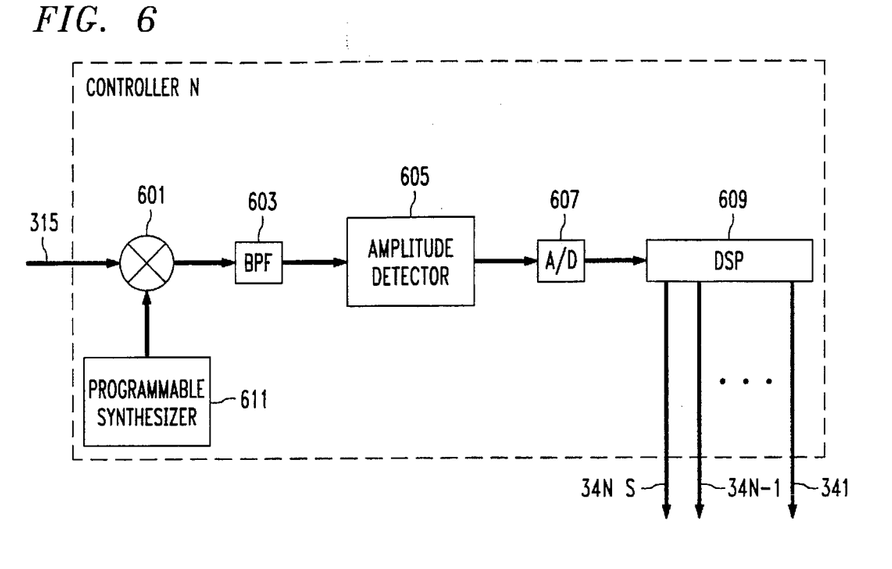
FIG. 6 is a block diagram of another illustrative controller as shown in FIG. 3.

FIG. 6 depicts a block diagram of an alternate embodiment of controller 307, which analyzes the multicarrier signal by scanning across it for individual carrier signals in sequential fashion. In this embodiment, controller 307 comprises mixer 601, programmable synthesizer 611, bandpass filter 603, amplitude detector 605, analog-to-digital converter 607 and digital signal processor 609. Mixer 601 mixes down the multicarrier signal from signal path 315 to an intermediate frequency, as directed by programmable synthesizer 611. The mixed-clown signal is sent to bandpass filter 603. Bandpass filter 603 is typically a high Q filter with a passband width equal to the frequency range of interest. Amplitude detector 605 takes the filtered multicarrier signal and determines the average power of the individual scanned signal, in well-known fashion.

Analog-to-digital converter 607 converts the analog output of amplitude detector 605 to a digital format for use by digital signal processor 609. Digital signal processor 609 determines the amplitude of the carrier signal being analyzed, and directs programmable synthesizer 611 to serially tune to a different carrier signal until all of the carrier signals in the multicarrier signal have been analyzed. Additionally, digital signal processor 609 determines which carrier signals should be targeted for attenuation or amplification. The digital signal processor directs each individual signal modifier by sending a signal indicating which carrier signal that individual signal modifier is to isolate and attenuate or amplify and, optionally, the amount of carrier signal amplification or attenuation.

Numerous advantages are realized through the use of the multicarrier signal processors of the present invention. For example, conventional systems typically employ interdigital filters in the position of filter 105 which are expensive to produce and bulky to install at cell sites. Such filters are needed in conjunction with conventional receivers to prevent interference between the bands of the A and B carriers within a cellular market. The present invention permits the use of smaller, less expensive filters in the receiver since the multicarrier signal processor essentially creates the effect of an ideal filter. Exemplary filters for use with the present invention are barium titanate duplex filters. Barium titanate duplex filters are described in U.S. Pat. No. 3,938,064, the disclosure of which is incorporated herein by reference.

The present invention advantageously reduces the dynamic range of a multicarrier signal without eliminating carrier signals and the information which they carry. Because individual carrier signals are merely attenuated or amplified, only the dynamic range is reduced without excluding the information-carrying frequency bands of the multicarrier signal.

While the foregoing invention has been described in terms of the exemplary embodiments, it will be readily apparent that numerous changes and modifications can be made. Accordingly, modifications such as those suggested above, but not limited thereto, are considered to be within the scope of the claimed invention.

What is claimed is:

1. A wireless telecommunication system comprising:
   (1) a mobile switching center;
   (2) at least one base station that is operably connected to said mobile switching center and that is capable of receiving a multicarrier signal;
   (3) a multicarrier signal processor within said at least one base station, said multicarrier signal processor comprising:
   (i) a signal divider for creating at least a first signal, a second signal, and a third signal based on said multicarrier signal, and for putting said first signal onto a first signal path, said second signal onto a second signal path, and said third signal onto a third signal path;
   (ii) a signal combinet for receiving at least said first signal from said first signal path and a modified third signal from said third signal path, and for creating an output signal by injecting at least said modified third signal into said first signal in a feedforward architecture;

(iii) an individual signal modifier in said third signal path for isolating from said third signal an isolated carrier signal, and for modifying a phase of said isolated carrier signal to create said modified third signal; and (iv) a controller for receiving said second signal from said second signal path, for analyzing said second signal to determine a relative power of each of a plurality of carrier signals which comprise said second signal, and for identifying said isolated carrier signal to be isolated by said individual signal modifier.

2. The apparatus of claim 1 further comprising a delay element in said first signal path for making a propagation delay through said first signal path substantially equal to a propagation delay through said third signal path.

3. The system of claim 1, wherein the individual signal modifier comprises:

a mixer for mixing down said third signal;

a bandpass filter for isolating said isolated carrier signal from said third signal;

an amplitude modifier for modifying the amplitude of said isolated carrier signal;

a phase-shifter for modifying the phase of said isolated carrier signal; and a second mixer mixing up said isolated carrier signal to create said modified third signal.

4. A method for processing a multicarrier signal, said method comprising:

creating at least a first signal, a second signal, and a third signal based on said multicarrier signal;

receiving said second signal in a controller;

analyzing said second signal in said controller to identify at least one carrier signal;

receiving said third signal in a signal modifier;

isolating said at least one carrier signal from said third signal to create an isolated carrier signal;

modifying a phase of said isolated carrier signal to create a modified carrier signal; and injecting said modified carrier signal into said first signal in accordance with a feedforward architecture.

* * * * *